US009489428B2

(12) United States Patent
Wang et al.

(10) Patent No.: US 9,489,428 B2
(45) Date of Patent: Nov. 8, 2016

(54) SEARCH RANKING METHOD AND SYSTEM FOR COMMUNITY USERS

(71) Applicant: Tencent Technology (Shenzhen) Company Limited, Shenzhen (CN)

(72) Inventors: Weibo Wang, Shenzhen (CN); Shushen Pan, Shenzhen (CN); Yi Wu, Shenzhen (CN); Fang Cao, Shenzhen (CN); Jing Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 307 days.

(21) Appl. No.: 14/139,180

(22) Filed: Dec. 23, 2013

(65) Prior Publication Data
US 2014/0122474 A1    May 1, 2014

Related U.S. Application Data

(63) Continuation of application No. PCT/CN2012/079944, filed on Aug. 10, 2012.

(30) Foreign Application Priority Data

Sep. 5, 2011  (CN) .......................... 2011 1 0260200

(51) Int. Cl.
*G06F 17/30* (2006.01)
*G06Q 50/00* (2012.01)

(52) U.S. Cl.
CPC ..... *G06F 17/3053* (2013.01); *G06F 17/30964* (2013.01); *G06Q 50/01* (2013.01)

(58) Field of Classification Search
CPC .......................... G06F 17/3053; G06Q 50/01
See application file for complete search history.

(56) References Cited

U.S. PATENT DOCUMENTS

2010/0169323 A1    7/2010    Liu et al.
2010/0241580 A1    9/2010    Schleier-Smith

FOREIGN PATENT DOCUMENTS

| CN | 101055587 |   | 10/2007 |
|----|-----------|---|---------|
| CN | 101297285 | A | 10/2008 |
| CN | 101588400 |   | 11/2009 |
| CN | 101661474 | A | 3/2010  |
| CN | 101661487 |   | 3/2010  |

(Continued)

OTHER PUBLICATIONS

International Search Report issued on Nov. 8, 2012 for PCT/CN2012/079944 filed on Aug. 10, 2012 with English Translation.

(Continued)

*Primary Examiner* — William Spieler
(74) *Attorney, Agent, or Firm* — Oblon, McClelland, Maier & Neustadt, L.L.P

(57) ABSTRACT

Disclosed is a search ranking method for community users. The method includes: calculating a pre-ranking factor and an offline ranking factor according to historical behavior data of users; performing weighted ranking on inverted indices of the users by taking the pre-ranking factor as a weight, to obtain orderly inverted user index data; and with respect to a logged-in search user, in search results obtained according to the index data, performing weighted calculation on the search results according to the offline ranking factor, to obtain final ranking results. Also disclosed is a search ranking system for community users. The method and system can enable a user to obtain more optimized search ranking results.

8 Claims, 3 Drawing Sheets

(56) References Cited

FOREIGN PATENT DOCUMENTS

| CN | 102098388 | 6/2011 | | |
|---|---|---|---|---|
| EP | 1 909 197 | 4/2008 | | |
| WO | 2006/071931 | 7/2006 | | |
| WO | WO 2011/050495 A1 | 5/2011 | | |
| WO | WO 2011050495 A1 * | 5/2011 | ....... | G06F 17/30864 |

OTHER PUBLICATIONS

Combined Office Action and Search Report issued Mar. 27, 2015 in Chinese Patent Application No. 201110260200.7 (with partial English translation).

Guilan Cheng, et al., "A Personal Recommendation Algorithm for Digital Library based on Hybrid Clustering Technology" Journal of WUT (Information & Management Engineering), vol. 33, No. 3, Jun. 30, 2011, pp. 379-381, 434, (with English Abstract).

Extended European Search Report issued Aug. 19, 2015 to European patent application No. 12830165.

Damon Horowitz et al., "The Anatomy of a Large-Scale Social Search Engine", Proceedings of the 19$^{th}$ International Conference on World Wide Web, WWW '10, Jan. 1, 2010, pp. 431-440, New York, New York, USA.

"Inverted Indexes", Modern Information Retrieval, Dec. 31, 2010, pp. 5-21, Retrieved from the Internet: URL: http://algo2.iti.kit.edu/download/ti_ss13_lec3.pdf.

Kisgyorgy Zoltan et al., "Semantic Analysis of Microposts for Efficient People to People Interactions", ROEDUNET International Conference (ROEDUNET), 2011 10th, IEEE, Jun. 23, 2011, pp. 1-4.

Ching-Yung Lin et al., "SmallBlue: Social Network Analysis for Expertise Search and Collective Intelligence", Data Engineering, 2009. ICDE '09. IEEE 25$^{th}$ International Conference, Piscataway, NJ, USA, Mar. 29, 2009, pp. 1483-1486.

* cited by examiner

U.S. 9,489,428 B2

SEARCH RANKING METHOD AND SYSTEM FOR COMMUNITY USERS

CROSS REFERENCE TO RELATED APPLICATIONS

This application is a continuation application of PCT Application PCT/CN2012/079944 filed on Aug. 10, 2012 claiming a priority from Chinese Application No. 201110260200.7 filed on Sep. 5, 2011. The aforementioned patent applications are hereby incorporated by reference in their entirety.

FIELD OF THE INVENTION

The invention relates to the field of Internet technologies, and in particular, to a search ranking method and system for community users.

BACKGROUND

Communitization is one of the most important directions in which the Internet develops. Many famous community websites, such as Weibo, Tianya, Qzone, Pengyou, RenRen, Xiaonei, and the like, are now providing to the masses of users a broader space for social activities without spatial and temporal limitations, and are gradually becoming an indispensable part of people's life.

With the development of network communitization, more and more people are using various communities, and the number of users within each community is also increasing rapidly. Finding persons in which the user is interested in the community, that is, a function for search ranking of community users, has become an important application provided to the user by the community. As to this application, how to quickly and accurately find the community users for which the user is searching from a massive amount of data and appropriately rank search results is an important factor reflecting the performance of this function.

However, in the search ranking provided by most of the communities nowadays, the searching part employs solely a user attribute matching search, and the ranking part simply employs ranking by degree of matching. That is, in the background of the community, user attribute fields, such as name, birth date, school, company, location, interests, etc. of the user, are stored fields by fields. When a search is conducted, searching and matching are performed in these fields based on a keyword inputted by the user to obtain search results; and the search results are ranked by the degree of matching with the keyword.

Given the current number of community users, a lot of search results will be obtained using the existing search ranking method. Also, because a single ranking factor is used, a lot of search results will have the same degree of matching. In the prior art, such search results are usually randomly ranked. As a result, search results seen by the user on the first page or first few pages of search results are not optimized, and are quite different from what the user really needs. The user usually needs to conduct multiple searches before he/she can find the desired person.

SUMMARY OF THE INVENTION

In view of this, the invention provides a search ranking method and system for community users, by which more optimized search ranking results can be obtained.

To achieve the above object, technical solutions of the invention are implemented as follows.

A search ranking method for community users, comprising:

calculating a pre-ranking factor and an offline ranking factor according to historical behavior data of users;

performing weighted ranking on inverted indices of users by taking the pre-ranking factor as a weight, to obtain orderly inverted user index data;

with respect to a logged-in search user, in search results obtained according to the index data, performing weighted calculation on the search results according to the offline ranking factor, to obtain final ranking results.

A search ranking system for community users, comprising:

an offline analysis module, which calculates a pre-ranking factor and an offline ranking factor according to historical behavior data of users;

an indexing module, which performs weighted ranking on inverted indices of users by taking the pre-ranking factor as a weight, to obtain orderly inverted user index data;

a ranking module, which, with respect to a logged-in search user, in search results obtained according to the index data, performs weighted calculation on the search results according to the offline ranking factor, to obtain final ranking results.

As can be seen from the above technical solutions, such a search ranking method and system for community users of the invention introduce into the ranking part of the search ranking technique a pre-ranking factor and an offline ranking factor calculated according to historical behavior data of users. By using the pre-ranking factor as a weight, when index data is established, pre-ranking is performed in advance on inverted indices, to obtain orderly inverted index data. Also, the offline ranking factor is used as a weight to further perform weighted calculation on search results obtained according to the orderly inverted index data. This enables ranking of the search results to better suit the user's needs, and be more relevant to the user. That is, the object of optimizing search results is achieved.

The foregoing is merely a summary of the technical solutions of the invention. In order to be able to more clearly understand the technical means of the invention and implement the same in accordance with the disclosure in the specification, and to make the above and other objects, features and advantages of the invention more apparent and easy to understand, detailed description will be given below with reference to specific embodiments in connection with the accompanying drawings.

DETAILED DESCRIPTION

In order to further describe the technical means adopted by the invention for achieving the predetermined invention objects and the effects thereof, specific implementations, structures, features and effects of a search ranking method and system for community users proposed according to the invention are described in detailed below in connection with the accompanying drawings and preferred embodiments.

The foregoing and other technical aspects, features and effects of the invention will be apparent from the following detailed description of the preferred embodiments with reference to the drawings. By describing the specific implementations, a more in-depth and specific understanding of the technical means adopted by the invention for achieving the predetermined invention objects and the effects thereof can be provided. However, the accompanying drawings are used for reference and explanation only, rather than limiting the invention.

The invention mainly lies in the ranking part of a search ranking method. A pre-ranking factor and an offline ranking factor calculated in advance according to historical behavior data of users are introduced. When index data is established, weighted ranking is performed on inverted indices of users by taking the pre-ranking factor as a weight, to obtain orderly inverted user index data. For a logged-in search user, in search results obtained according to the index data, weighted calculation is performed on the search results according to the offline ranking factor, to obtain final ranking results. With the pre-ranking factor and the offline ranking factor, the search ranking method of the invention better suits the user's needs, and is more relevant to the user.

Figure 1:
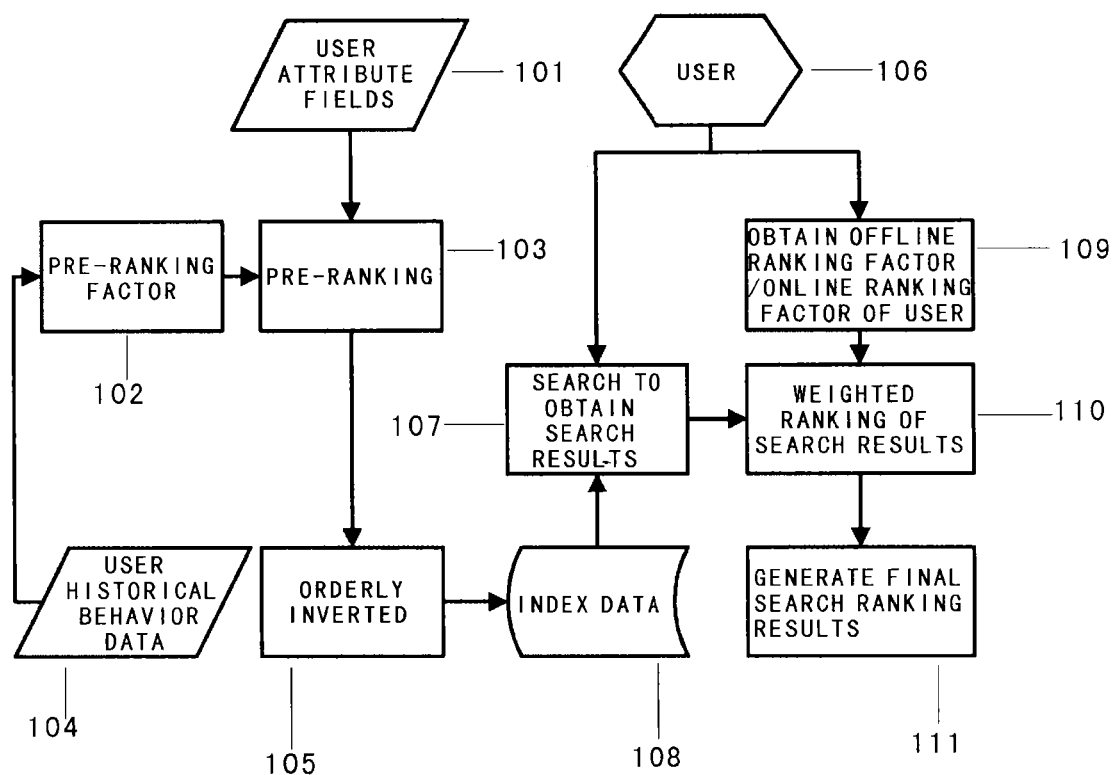
FIG. 1 is a diagram showing the implementing principles of a search ranking method of an embodiment of the invention.

FIG. 1 is a diagram showing the implementing principles of a search ranking method of the invention. As shown in FIG. 1, improvements made by the invention over the existing ranking include the following.

1. Index Data Establishing Process

When index data of the users is established, pre-ranking 103 is performed on inverted indices of the users according to a pre-ranking factor 102, to obtain user index data 108 that has been orderly inverted 105.

Index data is search indices based on user attribute fields 101 established in advance by a search engine. In the prior art, index data is not ranked and items in the index data are randomly arranged, while in the invention, the concept of a pre-ranking factor is introduced. Items are given different weights according to the pre-ranking factor. Weighted calculation, i.e., pre-ranking, is performed on items in the index data, to thereby obtain orderly inverted index data that has been ranked. It is guaranteed that more optimized data is ranked higher in each inverted array. Thus, ranking of search results (community users) is more optimized.

The pre-ranking factor may be a numerical value calculated from certain historical behavior data 104 of users. For example, activeness of a community user is calculated through a user level of the user in the community and the user's recent log-ins and usages of the community. A community user with high activeness will be ranked high in the inverted array. Thus, when a user searches for community users, without other operations, community users with high activeness can be presented as top search results. The specific method for calculating the activeness can be determined depending on specific requirements.

2. Ranking Process

When search results are ranked, the invention introduces an offline ranking factor and an online ranking factor 109. Weighted calculation 110 is further performed on search results 107 obtained through index data, to obtain final ranking results 111. The offline ranking factor and the online ranking factor can be used simultaneously, or only one of them can be used.

Both the offline ranking factor and the online ranking factor are information obtained by analysis according to certain historical behavior data of users. The difference is that the online ranking factor is information for weighted calculation obtained by real-time analysis when a user 106 conducts a search, while the offline ranking factor can be obtained by analysis in advance before the user conducts a search.

A. Examples of Offline Ranking Factor

1. User preference or user category information: by analyzing data on articles posted or read by the user in the community, persons with whom the user has communicated or become friends, persons followed by the user, and the like, information on the user's preferences and the category to which the user belongs can be determined. Community users having the same preferences or belonging to the same category as the search user can be given a greater weight in ranking, such that community users having the same preferences or belonging to the same category as the user are ranked higher among the search results.

2. User potential friendship chain information: by analyzing various friendship data, such as the existing friend circle of the user in the community, persons followed by the user, friends of these users, and the like, user potential friendship chain information is obtained. Thus, when the user conducts a search, community users in the user's potential friendship chain among the search results can be given a greater weight, such that community users having potential friendship with the user are ranked higher among the search results.

3. Intimacy degree information: according to data on interactivities between a user and other community users, the degree of intimacy between the other community users and the user is calculated. When this user conducts a search, community users having a higher degree of intimacy with the user among the search results can be given a greater weight, such that community users having a higher degree of intimacy with the user are ranked higher among the search results.

Of course, all the offline ranking factors of a user are based on historical behavior data of the user in the community. Therefore, the above offline ranking factors can only be applied when the identity of the user has been confirmed. That is, they can only be applied in an online search state after the user has logged into the community. It is possible that only one of the offline ranking factors given above as examples is used in ranking. It is also possible that a plurality of offline ranking factors are used for comprehensive ranking.

B. Examples of Online Ranking Factor

1. User location information: when a user conducts a search, the current IP address of the user can be retrieved as the location information of the user. In ranking, community users in the same location as the user among the search results are given a greater weight, such that community users located in the same location as the user or near the location of the user are ranked higher. As an online ranking factor, user location information can be applied both in a non-login search performed when the user has not logged into the community, and a logged-in search performed after the user has logged into the community.

2. User attribute information: when a user conducts a search, personal profile data in the registration information of the user can be searched, such as location, school, time graduated, company, hobbies, etc. In ranking, community users having the same attribute information as the user among the search results are given a greater weight, such that community users having same or similar attributes as the user are ranked higher. Because user attribute information can only be obtained after the user has logged in, user attribute information as an online ranking factor can only be applied in a logged-in search performed after the user has logged into the community.

When search results are ranked according to the above offline ranking factors or online ranking factors, the specific assignment of weights can be determined as required by specific applications. After all the weights have been determined, comprehensive ranking is performed according to all the weights, to eventually obtain optimized ranking results.

Figure 2:
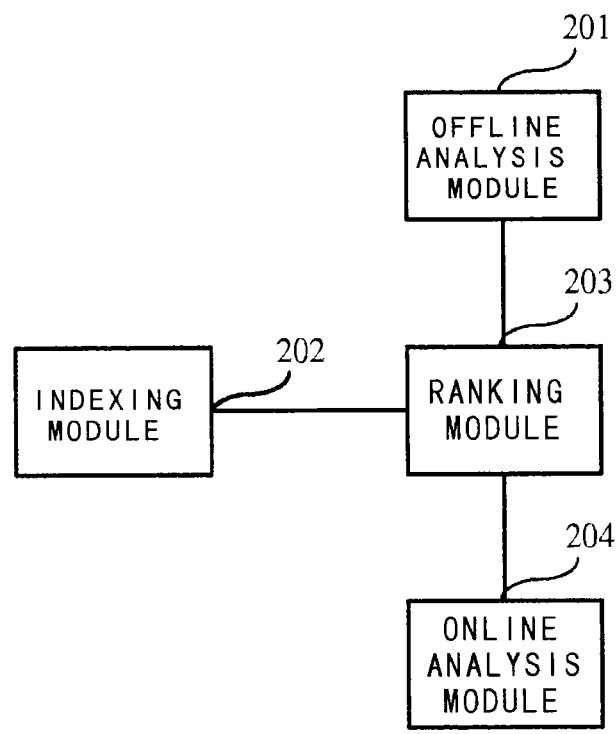
FIG. 2 is a schematic diagram showing the structure of a search ranking system of an embodiment of the invention.

In addition, the invention also provides a search ranking system for community users realized by applying the ideas discussed above. As shown in FIG. 2, the system comprises:

an offline analysis module 201, which calculates a pre-ranking factor and an offline ranking factor according to historical behavior data of users;

an indexing module 202, which performs weighted ranking on inverted indices of users by taking the pre-ranking factor as a weight, to obtain orderly inverted user index data;

a ranking module 203, which, with respect to a logged-in search user, in search results obtained according to the index data, performs weighted calculation on the search results according to the offline ranking factor, to obtain final ranking results.

As a preferred embodiment, the system may further comprise:

an online analysis module 204, which, with respect to a non-login search user, obtains location information of the non-login search user to calculate an online ranking factor;

with respect to the non-login search user, in search results obtained according to the index data, the ranking module 203 further performs weighted calculation on the search results according to the online ranking factor, such that items in the same location as the user or near the location of the user are ranked higher, to obtain final ranking results.

Alternatively, as another preferred embodiment, the system may also further comprise an online analysis module 204;

wherein the online analysis module 204 obtains location information of the logged-in search user to calculate an online ranking factor;

the ranking module 203 further performs weighted calculation on the search results according to the offline ranking factor and the online ranking factor, such that items in the same location as the logged-in search user or near the location of the logged-in search user are ranked higher, to obtain final ranking results.

Alternatively, as another preferred embodiment, the system may also further comprise an online analysis module 204;

wherein, with respect to a logged-in search user, the online analysis module 204 calculates an online ranking factor according to attribute information of the logged-in search user;

in search results obtained according to the index data, the ranking module 203 further performs weighted calculation on the search results according to the online ranking factor and the offline ranking factor, such that community users having same or similar attributes as the logged-in search user are ranked higher, to obtain final ranking results.

Figure 3:
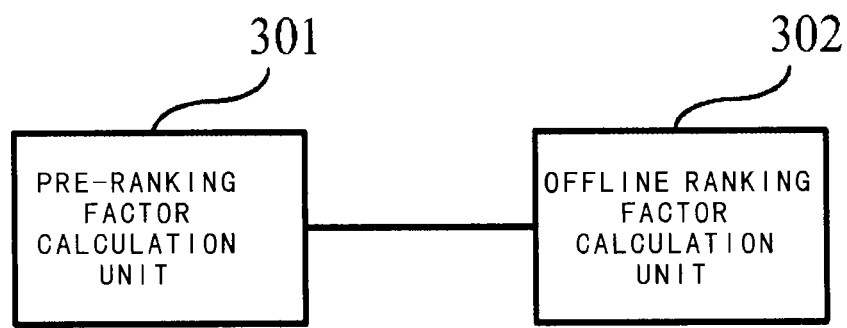
FIG. 3 is a schematic diagram showing the structure of an offline analysis module of an embodiment of the invention.

In addition, as a preferred embodiment, the offline analysis module 201, as shown in FIG. 3, may comprise:

a pre-ranking factor calculation unit 301, which calculates a pre-ranking factor according to user activeness calculated according to data on a user level of the user in the community and data on the user's recent log-ins and usages of the community;

an offline ranking factor calculation unit 302, which calculates an offline ranking factor according to user preference information or user category information obtained by analyzing data on articles posted or read by the user in the community, persons with whom the user has communicated or become friends, and directions followed by the user;

and/or calculates an offline ranking factor according to user potential friendship chain information obtained by analyzing data on friends of the user in the community and persons followed by the user in the community;

and/or calculates an offline ranking factor according to user intimacy degree information calculated according to data on interactivities between the user and friends.

As can be seen from the above embodiments, such a search ranking method and system for community users of the invention introduce ranking factors, such as user profile matching, activeness, potential friendship chain, degree of intimacy between users, and the like, into result ranking by analyzing the profile and behaviors of the user, and realize community user searching with higher accuracy and higher quality. For the user, efficiency of his/her searching can be improved efficiently, his/her search needs can be quickly met in a maximal way, and his/her satisfaction with the searching and the community can be improved. Meanwhile, his/her enthusiasm in searching can be aroused, popularity and activeness of the community can also be efficiently improved, and thus user stickiness of the community can be increased. Benefits can thus be provided to both the user and the community.

The foregoing is just a description of embodiments of the invention, and is not intended to limit the invention in any sense. Although the invention has been disclosed above by embodiments, the invention is not limited to this. Anyone skilled in the art can make equivalent embodiments with equivalent variations by making some alternations or modifications using the technical contents disclosed above, without departing from the scope of the technical solutions of the invention. Any simple alternations, equivalent variations or modifications made to the above embodiments in accordance with the technical substance of the invention without departing from the technical solutions of the invention are within the scope of the technical solutions of the invention.

INDUSTRIAL APPLICABILITY

The invention introduces ranking factors, such as user profile matching, activeness, potential friendship chain, degree of intimacy between users, and the like, into result ranking by analyzing the profile and behaviors of the user, and realizes community user searching with higher accuracy and higher quality. For the user, efficiency of his/her searching can be improved efficiently, his/her search needs can be quickly met in a maximal way, and his/her satisfaction with the searching and the community can be improved. Meanwhile, his/her enthusiasm in searching can be aroused, popularity and activeness of the community can also be efficiently improved, and thus user stickiness of the community can be increased. Benefits can thus be provided to both the user and the community.

What is claimed is:

1. A search ranking method for community users, comprising:

calculating, by a search ranking system, a pre-ranking factor and an offline ranking factor according to historical behavior data of users searched from a search for community users according to a keyword inputted by a searching user;

performing, by the search ranking system, a first weighted ranking on inverted indices of searched users by taking the pre-ranking factor as a weight, to obtain orderly inverted indices data, wherein the inverted indices of searched users are obtained by from said search for community users;

in a case that the searching user is a logged-in search user, performing, by the search ranking system, a second weighted ranking on search results of the first weighted ranking according to the offline ranking factor, to obtain final ranking results for community users; and presenting the final ranking results for community users to the searching user, wherein the pre-ranking factor includes user activeness information calculated according to data on a user level of a user in the community, and data on the user's recent log-ins and usages of the community, and the offline ranking factor includes at least one of user preference information or user category information obtained by analyzing data on articles posted or read by a user in a community, persons with whom the searching user has communicated or become friends, and persons followed by the searching user;

user potential friendship chain information obtained by analyzing data on friends of the searching user in the community and persons followed by the searching user in the community; and user intimacy degree information calculated according to data on interactivities between the searching user and friends.

2. The search ranking method for community users according to claim 1, further comprising:

in the case that the searching user is a non-login search user, obtaining, by the search ranking system, location information of the non-login search user to calculate an online ranking factor; and performing, by the search ranking system, a third weighted ranking on search results of the second weighted ranking according to the online ranking factor, such that items in the same location as the non-login searching user or near the location of the non-login searching user are ranked higher, to obtain final ranking results.

3. The search ranking method for community users according to claim 1, further comprising:

obtaining, by the search ranking system, location information of the logged-in search user to calculate an online ranking factor; and performing, by the search ranking system, a third weighted ranking on search results of the second weighted ranking according to the online ranking factor, such that items in the same location as the logged-in searching user or near the location of the logged-in searching user are ranked higher, to obtain final ranking results.

4. The search ranking method for community users according to claim 1, further comprising:

calculating, by the search ranking system, an online ranking factor according to attribute information of the logged-in searching user; and performing, by the search ranking system, weighted ranking on search results of the second weighted ranking according to the online ranking factor, such that community users having same or similar attributes as the logged-in searching user are ranked higher, to obtain final ranking results.

5. A search ranking system for community users, comprising:

processing circuitry configured to:

calculate a pre-ranking factor and an offline ranking factor according to historical behavior data of users searched from a search for community users according to a keyword inputted by a searching user;

perform a first weighted ranking on inverted indices of searched users by taking the pre-ranking factor as a weight, to obtain orderly inverted indices data, wherein the inverted indices of searched users are obtained by from said search for community users;

in a case that the searching user is a logged-in searching user of the community user, perform a second weighted ranking on search results of the first weighted ranking according to the offline ranking factor, to obtain final ranking results for community users; and present the final ranking results for community users to the searching user, wherein the pre-ranking factor includes user activeness information calculated according to data on a user level of a user in the community, and data on the user's recent log-ins and usages of the community, and the offline ranking factor includes at least one of user preference information or user category information obtained by analyzing data on articles posted or read by a user in a community, persons with whom the searching user has communicated or become friends, and persons followed by the searching user;

user potential friendship chain information obtained by analyzing data on friends of the searching user in the community and persons followed by the searching user in the community; and user intimacy degree information calculated according to data on interactivities between the searching user and friends.

6. The search ranking system for community users according to claim 5, wherein the processing circuitry is further configured to:

in a case that the searching user is a non-login searching user, obtain location information of the non-login searching user to calculate an online ranking factor; and perform a third weighted ranking on search results of the second weighted ranking according to the online ranking factor, such that items in the same location as the non-login searching user or near the location of the searching user are ranked higher, to obtain final ranking results.

7. The search ranking system for community users according to claim 5, wherein the processing circuitry is further configured to:

obtain location information of the logged-in searching user to calculate an online ranking factor; and perform a third weighted ranking on search results of the second weighted ranking according to the online ranking factor, such that items in the same location as the logged-in searching user or near the location of the logged-in searching user are ranked higher, to obtain final ranking results.

8. The search ranking system for community users according to claim 5, wherein the processing circuitry is further configured to:

calculate an online ranking factor according to attribute information of the logged-in searching user; and perform a third weighted ranking on search results of the second weighted ranking according to the online ranking factor, such that community users having same or similar attributes as the logged-in searching user are ranked higher, to obtain final ranking results.

\* \* \* \* \*